United States Patent
Ikemoto (10) Patent No.: US 7,788,425 B2
(45) Date of Patent: Aug. 31, 2010

(54) CONNECTION DEVICE RESTRICTION PROGRAM AND DEVICE

(75) Inventor: Kazuo Ikemoto, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 1291 days.

(21) Appl. No.: 11/088,435

(22) Filed: Mar. 24, 2005

(65) Prior Publication Data

US 2006/0143716 A1    Jun. 29, 2006

(30) Foreign Application Priority Data

Dec. 28, 2004    (JP)    ............................... 2004-378611

(51) Int. Cl.
*G06F 3/00*    (2006.01)
*G06F 13/36*    (2006.01)

(52) U.S. Cl. ........................... 710/36; 710/113; 726/26; 713/171

(58) Field of Classification Search ............. 710/36–51, 710/107–113; 726/26–30; 713/164–171
See application file for complete search history.

(56) References Cited

U.S. PATENT DOCUMENTS

| | | | |
|---|---|---|---|
| 5,835,737 A * | 11/1998 | Sand et al. .................. | 710/113 |
| 7,302,570 B2 * | 11/2007 | Beard et al. ................. | 713/171 |
| 7,373,670 B2 * | 5/2008 | Mimatsu et al. .............. | 726/27 |
| 7,406,323 B2 * | 7/2008 | Ayatsuka et al. ............. | 455/461 |
| 2003/0054821 A1 | 3/2003 | Kita et al. | |
| 2004/0092231 A1 * | 5/2004 | Ayatsuka et al. ........... | 455/41.2 |
| 2004/0141190 A1 * | 7/2004 | Akashi ....................... | 358/1.6 |
| 2006/0010502 A1 * | 1/2006 | Mimatsu et al. .............. | 726/27 |
| 2006/0143716 A1 * | 6/2006 | Ikemoto ...................... | 726/27 |
| 2007/0104180 A1 * | 5/2007 | Aizu et al. .................. | 370/352 |

FOREIGN PATENT DOCUMENTS

| | | |
|---|---|---|
| JP | 10-031627 | 2/1998 |
| JP | 2003-006166 | 1/2003 |
| JP | 2003-92578 | 3/2003 |
| JP | 2003-288128 | 10/2003 |
| JP | 2004-78359 | 3/2004 |
| JP | 2004-104393 | 4/2004 |

* cited by examiner

*Primary Examiner*—Christopher B Shin
(74) *Attorney, Agent, or Firm*—Greer, Burns & Crain, Ltd.

(57) ABSTRACT

A connection device restriction program for preventing use of uncalled-for connection devices. A permission list setting unit sets a connection permission list holding information defining connection devices whose connection is to be permitted, and a list memory stores the connection permission list. When a connection device is connected to one of first to third connection ports, a connection restriction unit acquires device information from the connection device, and collates the device information with the connection permission list to determine whether or not the connection device corresponds to any one of the connection-permitted devices. If the connection device corresponds to any one of the connection-permitted devices, connection of the device is permitted; if not, connection of the device is forbidden.

8 Claims, 11 Drawing Sheets

Add USB Device

Specify a device whose connection is to be permitted.

411

● Specify unique ID ↓  412
- ○ Vendor ID:
- ○ Product ID:
- ○ Serial No.:

○ Specify device type ↓  413
- ○ HID device
- ○ Audio device
- ○ Printer device
- ○ Video device ○ Specify from among connected devices ↓  414

| Vendor name | Product name |
|---|---|
| F Corp. | MouseFMM123 |
| F Corp. | Keyboard345 |
| C Corp. | Scannertype2 |
| E Corp. | Printercolor |

[OK]  [Cancel]

CONNECTION DEVICE RESTRICTION PROGRAM AND DEVICE

CROSS-REFERENCE TO RELATED APPLICATIONS

This application is based upon and claims the benefits of priority from the prior Japanese Patent Application No. 2004-378611, filed on Dec. 28, 2004, the entire contents of which are incorporated herein by reference.

BACKGROUND OF THE INVENTION

1. Field of the Invention

The present invention relates to connection device restriction program and device, and more particularly, to a program and device for restricting use of connection devices connected to a computer.

2. Description of the Related Art

Computers used in offices and homes, for example, personal computers (hereinafter PCs), have a built-in function of automatically installing device drivers and making necessary settings when peripheral devices or expansion cards (hereinafter referred to generically as devices) are connected. For example, PCs are equipped with connection devices, as typified by USB (Universal Serial Bus), which permit easy connection of various peripheral devices including a keyboard, a mouse, an external storage, etc.

A USB device has a built-in function of transmitting information such as device type in response to a request from an OS (Operating System), which is basic software, when the USB device is connected to a PC.

Figure 11:
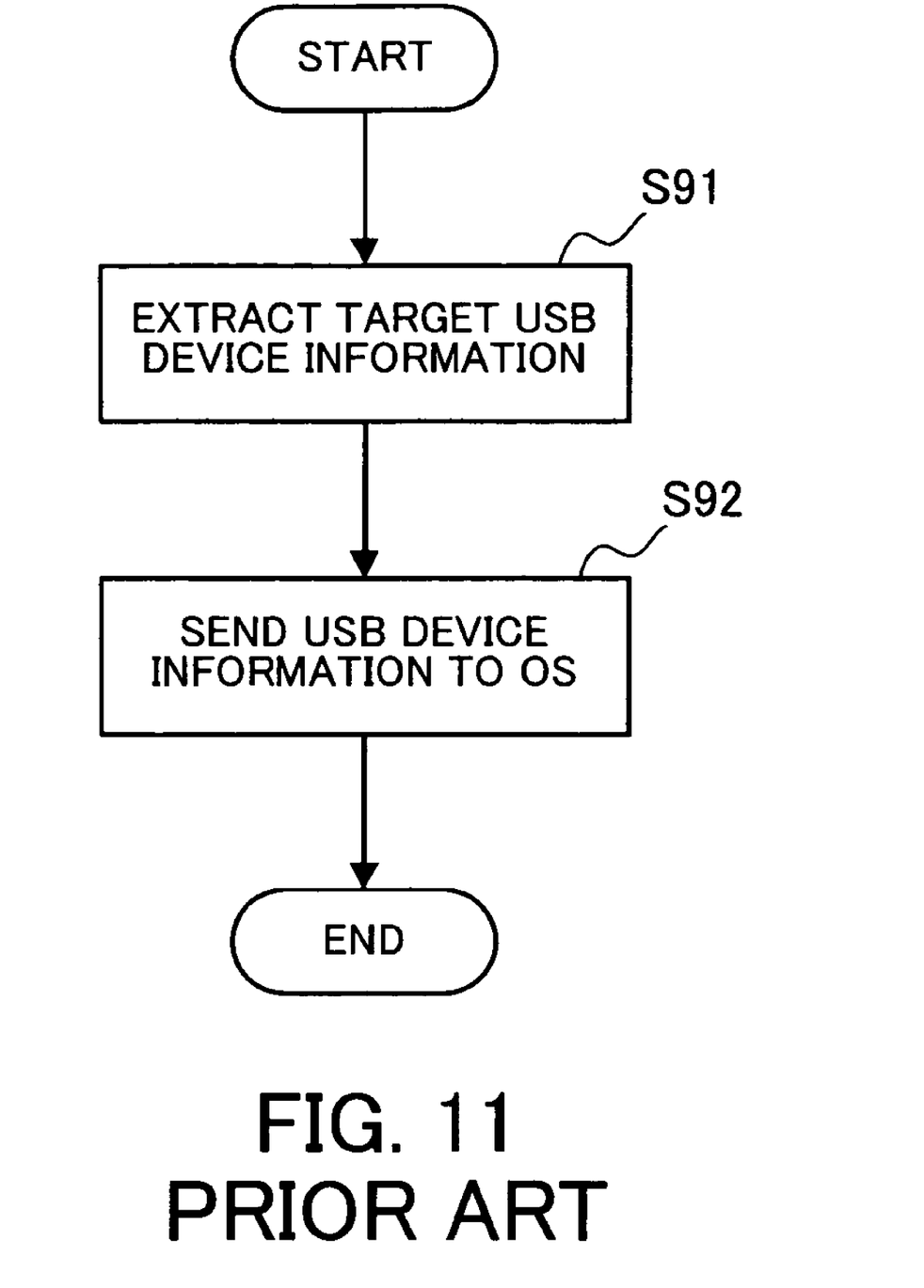
FIG. 11 is a flowchart showing a conventional procedure for reading out USB device information.

FIG. 11 is a flowchart showing a conventional procedure for reading out USB device information. On receiving a notification that a USB device has been connected to a connection port, the OS requests device information on the connected USB device and extracts target USB device information (Step S91). The extracted USB device information is then sent to the OS (Step S92). After the USB device information is acquired in this manner, the OS identifies the device type etc. of the connected device and performs necessary processing to permit use of the connected device. This procedure enables immediate use of a device newly connected to USB.

However, the ease of connection of peripheral devices poses security problems such as a leakage of information from the PC or ingress of unnecessary information into the PC.

To solve such problems, there have been proposed techniques for restricting use of peripheral devices according to their categories. The category "storage", for example, is set, whereupon a storage device, if connected, cannot be used.

A connection collation system has also been proposed in which the serial numbers of connection terminals are registered in a computer, the serial number of a connection terminal requesting permission for connection is collated with the registered serial numbers, and connection of the terminal is permitted only if the serial number of the terminal is registered (see Unexamined Japanese Patent Publication No. 2003-6166 (paragraph nos. [0007] to [0019], FIG. 1), for example).

However, the conventional connection device restriction techniques are poor in usability because of the inability to allow detailed setting of restriction conditions or the need for complicated setting operation, and are associated with a problem that the use of uncalled-for connection devices cannot be prevented.

Where the use of devices is restricted according to categories, it is not possible to place restrictions on individual devices separately, since the determination as to restriction is made at a level near the application program, namely, at a level where the information on devices is so abstracted that detailed information on individual devices is not available. For example, if restriction is placed on the category "storage", all storages fail to be connected. A problem also arises in that restriction can be imposed only on the existing categories.

On the other hand, with the connection collation system in which the serial number of a connection terminal is collated to determine whether to permit connection of the terminal, it is necessary to register the serial numbers of all terminals whose connection is to be permitted. Thus, if the system is operated on a large scale, the number of terminals to be registered increases, making the registration work complicated and also possibly entailing erroneous registration. Further, the system merely determines whether a terminal may be connected or not and does not allow detailed settings such that a certain terminal is permitted to read but not to write, for example.

Thus, with the conventional device restriction techniques, restrictions can only be placed according to existing categories or on individual devices, and it is not possible to make various restriction settings, such as restrictions on users, makers, products, connection devices to be used, modes of use, etc. For example, the conventional techniques are unable to cope with a situation where "Mr. A is permitted to use only the USB memory with the identification number Z and the product name Y, produced by X Corporation, and is not permitted to use other USB memories and USB devices." Accordingly, there is every possibility that restriction fails to be imposed in a desired manner or that the settings are omitted or erroneously made, giving rise to a security problem that the use of uncalled-for devices cannot be prevented.

SUMMARY OF THE INVENTION

The present invention was created in view of the above circumstances, and an object thereof is to provide connection device restriction program and device whereby use of connection devices connected to a computer can be restricted under desired conditions specifying device types, individual devices, users, etc., thereby preventing the use of uncalled-for connection devices and enhancing security.

To achieve the object, there is provided a connection device restriction program for restricting use of connection devices connected to a computer. The connection device restriction program causes the computer to execute the step of setting a connection permission list defining a connection-permitted device which is permitted to connect with the computer and storing the connection permission list in a list memory, the step of acquiring device information from a connection device when the connection device is connected, the step of collating the acquired device information with the connection permission list to determine whether or not the connection device corresponds to the connection-permitted device registered in the connection permission list, and the step of permitting connection of the connection device if the connection device corresponds to the connection-permitted device and otherwise forbidding connection of the connection device.

Also, to achieve the above object, there is provided a connection device restriction device for restricting use of connection devices connected to a computer. The connection device restriction device comprises a permission list setting unit for setting a connection permission list based on information defining a connection-permitted device which is permitted to connect with the computer, a list memory for storing the connection permission list, and a connection restriction unit for acquiring device information from a connection device when the connection device is connected, collating the acquired device information with the connection permission list to determine whether or not the connection device corresponds to the connection-permitted device registered in the connection permission list, and permitting connection of the connection device if the connection device corresponds to the connection-permitted device and otherwise forbidding connection of the connection device.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings. First, the concept of the invention will be explained, and then specific embodiments to which the invention is applied will be described.

Figure 1:
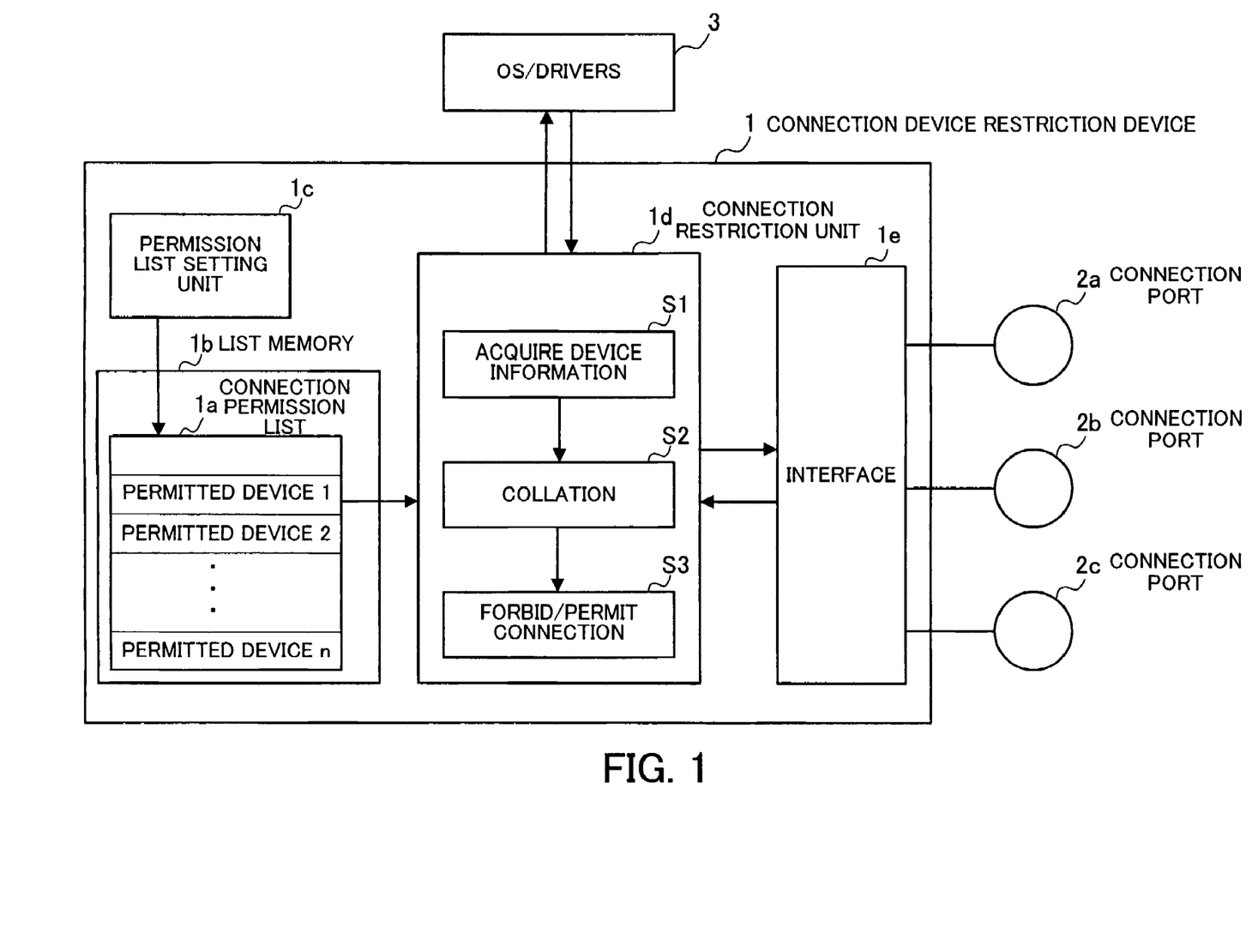
FIG. 1 is a conceptual diagram illustrating the invention applied to embodiments.

FIG. 1 is a conceptual diagram illustrating the invention applied to the embodiments.

A connection device restriction device 1 according to the present invention is located on the route of information flow between a software group in a computer, such as OS/drivers 3, and connection ports 2a, 2b and 2c to which are connected connection devices (hereinafter devices) as peripheral devices, and controls the data exchange between the OS/drivers 3 and the devices connected to the connection ports 2a, 2b and 2c. The connection device restriction device 1 includes a list memory 1b for storing a connection permission list 1a defining connection-permitted devices (hereinafter permitted devices), a permission list setting unit 1c for setting the connection permission list 1a, a connection restriction unit 1d for restricting connection of devices, and an interface 1e for controlling the data transfer through the connection ports 2a, 2b and 2c.

The list memory 1b stores the connection permission list 1a and is accessible from the permission list setting unit 1c and the connection restriction unit 1d. The connection permission list 1a contains information defining permitted devices whose connection is permitted, that is, information for specifying such permitted devices. The amount of device specification information can be variably set depending on the mode of restriction, as described in detail later, and the number of items (hereinafter specification items) for specifying a permitted device is determined by a target device whose connection is to be permitted. In the case where the specification items include vendor name and product name, for example, and a vendor name is specified as a specification item, connection of the devices with the specified vendor name is permitted. If both a vendor name and a product name are specified as specification items, connection of the devices with the specified vendor name and the specified product name is permitted. It is also possible to make settings so as to permit connection of certain device types such as HID (Human Input Device).

The permission list setting unit 1c acquires information to be registered in the connection permission list 1a, sets the acquired information in the connection permission list 1a, and stores the list in the list memory 1b. A setting application which urges the user to register information for creating the connection permission list 1a may be stored externally to the permission list setting unit 1c, and the permission list setting unit 1c may be so configured as to receive the created connection permission list 1a and store the list in the list memory 1b.

When the connection of a device to one of the connection ports 2a, 2b and 2c is detected through the interface 1e, the connection restriction unit 1d acquires, via the interface 1e, device information for specifying the connected device (Step S1). Then, using the acquired device information, the connection restriction unit 1d collates the connected device with the permitted devices registered in the connection permission list 1a (Step S2). If the connected device corresponds to any one of the permitted devices registered in the connection permission list 1a, connection of the device is permitted; if not, connection of the device is forbidden (Step S3).

The interface 1e controls the data exchange between the connection restriction unit 1d and devices connected to the connection ports 2a, 2b and 2c. Specifically, the interface 1e transfers information acquired from the devices to the connection restriction unit 1d and also transfers information acquired from the connection restriction unit 1d to the devices.

The aforementioned individual processing units of the connection device restriction device 1 are implemented by causing a computer to execute a connection device restriction program. The processing units may alternatively be implemented by hardware or by the combination of hardware and software.

Operation of the connection device restriction device 1 configured as above will be now described.

Administrator or user registers in advance information defining devices whose connection is to be permitted. The permission list setting unit 1c sets the connection permission list 1a based on the registered information, and stores the list in the list memory 1b. In the connection permission list 1a, information specifying permitted devices, such as a maker name, a product name, a device serial number, as well as a device type as a whole, can be registered as desired. For example, it is possible to specify that "all products from maker X are permitted", or "product Y, among those from maker X, is permitted", or "product Y with serial number Z, among those from maker X, is permitted." This makes it possible to place restrictions on use of devices in a desired manner such that use of only the specified devices is permitted or that use of devices is permitted without specifying individual devices. Also, instead of specifying individual devices, a device type as a whole can be specified in a manner such that "HID devices of all makers are permitted," for example. In this case, use of all HID devices is permitted collectively, and this eliminates the need to make settings for the individual HID devices.

If, after the connection permission list 1a is stored in the list memory 1b, connection of a device to one of the connection ports 2a, 2b and 2c is detected through the interface 1e, the connection restriction unit 1d is notified of the connection of the device. The connection restriction unit 1d acquires device information on the connected device through the interface 1e, and collates the acquired device information with the connection permission list 1a to determine whether connection of the device is permitted or not. If the device is found to be a permitted device, connection of the device is permitted; if not, connection of the device is forbidden. For example, if the connection permission list 1a includes a registration that "all products from maker X are permitted" and if the maker of the connected device is X, connection of the device is permitted. Then, the connection restriction unit 1d notifies the OS/drivers 3 of the connection of the device and permits the device to be used thereafter. On the other hand, if the maker of the connected device differs from maker X, connection of the device is forbidden. In this case, use of the device is forbidden by, for example, not notifying the OS/drivers 3 of the connection of the device.

Figure 2:
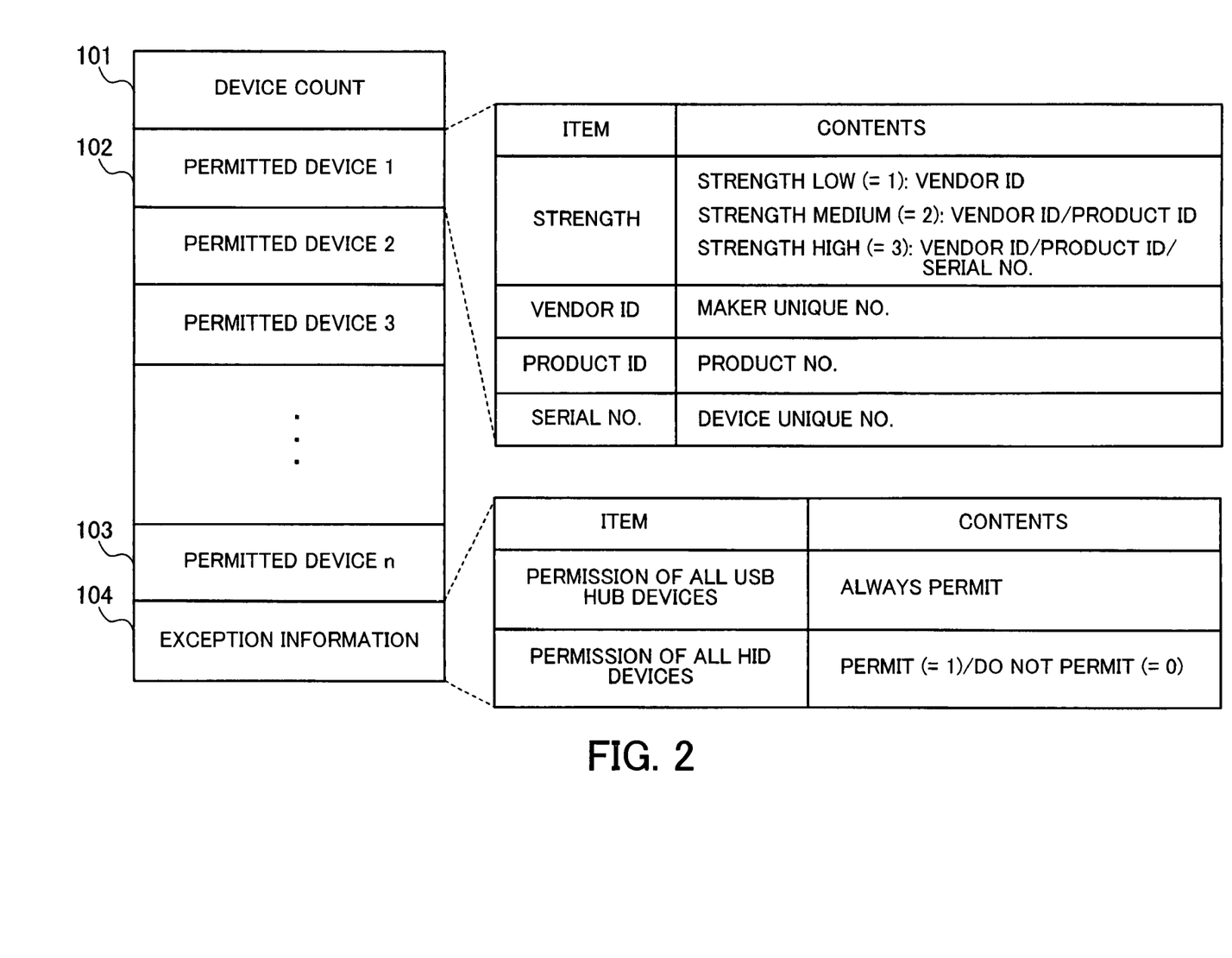
FIG. 2 shows an exemplary arrangement of a connection permission list.

The connection permission list will be now described with reference to FIG. 2 showing an exemplary connection permission list.

In the illustrated example, the connection permission list has fields including "DEVICE COUNT" 101 for storing the number of devices set in the connection permission list, "PERMITTED DEVICE 1" 102 through "PERMITTED DEVICE n" 103 defining respective permitted devices, and "EXCEPTION INFORMATION" 104 defining exceptions.

In the field "DEVICE COUNT" 101 is stored a total number of permitted devices registered in the connection permission list. Since the total number of registered devices is known from this field, collation with unnecessary fields can be omitted, thereby making the collation process faster.

In the fields "PERMITTED DEVICE 1" 102 through "PERMITTED DEVICE n" 103 is stored information defining respective permitted devices. For each registered device, a strength corresponding to permission level is determined. The strength indicates the degree of particularization of the permitted device. Higher strength requires more specification items, so that the permitted device is specified in further detail. The specification items include vendor ID, product ID, and serial number. The vendor ID is a number uniquely assigned to an individual maker for identifying the maker. The product ID is a number assigned to an individual product for identifying the product, and the serial number is a number serially assigned to an individual device for specifying the device. In the illustrated example, where the strength is low (=1) in which the number of specification items is smallest, the vendor ID alone is specified. Namely, it is possible to enter a registration that "all products from maker X are permitted," for example. In the case of medium (=2) strength with more specification items, the vendor ID and the product ID are specified. It is therefore possible to enter a registration that "product Y, among those from maker X, is permitted," for example. Where the strength is high (=3) in which individual devices are specified, the vendor ID, the product ID and the serial number are designated as the specification items. Namely, it is possible to enter a registration that "product Y with serial number Z, among those from maker X, is permitted," for example.

In the field "EXCEPTION INFORMATION" 104 is registered information specifying a group of devices as a whole, such as device type, to be permitted or forbidden, and not individual devices as permitted devices. In the illustrated example, the exception information includes items relating to permission of USB hub devices and permission of HID devices. With respect to the item relating to permission of USB hub devices, "ALWAYS PERMIT" is set. This setting is made since use of USB hubs needs to be always permitted in order to control the devices connected to the USB hubs. For the item relating to permission of HID devices, whether all HID devices should be forbidden (=0) or permitted (=1) is selected and set. Thus, whether to permit connection or not can be set with respect to device types, making it possible to save the time and labor spent on the registration of individual permitted devices. For example, in cases where no problem is expected to result if HID devices are connected but it is difficult to specify individual makers of HID devices that may be used, the exception information 104 may be set as illustrated, whereby use of all HID devices can be permitted with ease. On the other hand, where leak of information to outside should be prevented, connection of storage devices may be forbidden by means of the exception information 104, in which case use of all storage devices is forbidden.

As described above, the connection permission list not only permits individual devices to be set as permitted devices but also permits device types to be set collectively as permitted or forbidden devices. Since devices whose connection is to be permitted can be set at desired permission levels, the user or administrator can easily create a desired permission list matching the use of the computer or the system configuration. Also, the connection device restriction device has only to perform substantially the same process (collation of the device information acquired from a device with the specification items of the registered permitted devices) regardless of strength level. Further, the specification items of the connection permission list are set on the basis of information available from devices, and therefore, the restriction device can deal with conventional devices.

An embodiment of the present invention will be now described in detail with reference to the drawings wherein the invention is applied to a PC to restrict connection of devices connected to USB ports, by way of example.

Figure 3:
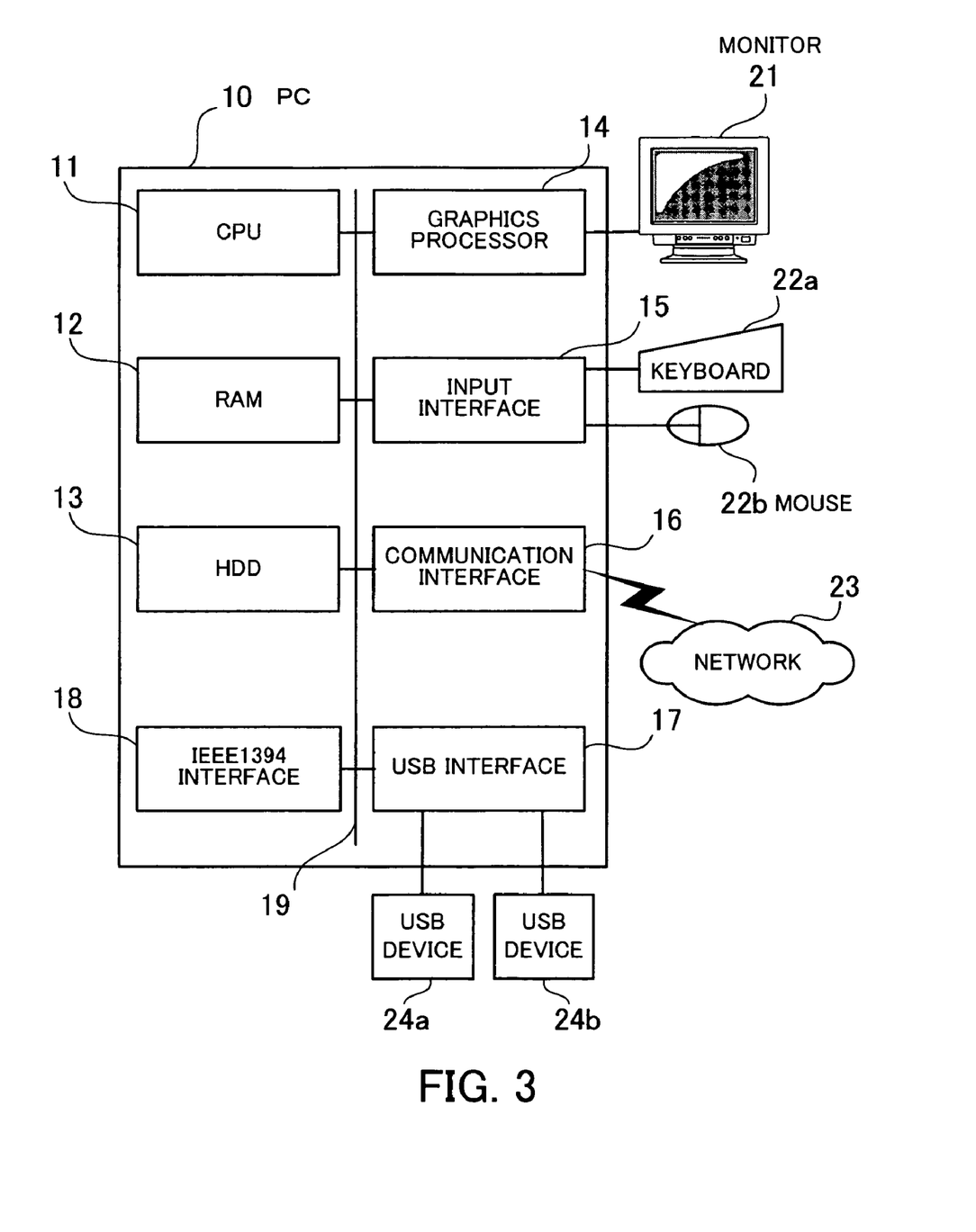
FIG. 3 is a block diagram showing an exemplary hardware configuration of a PC in which a connection device restriction device according to an embodiment is incorporated.

FIG. 3 is a block diagram showing an exemplary hardware configuration of a PC in which the connection device restriction device according to the embodiment is incorporated.

The PC 10 is in its entirety under the control of a CPU (Central Processing Unit) 11. The CPU 11 is connected, through a bus 19, with a RAM (Random Access Memory) 12, a hard disk drive (HDD) 13, a graphics processor 14, an input interface 15, a communication interface 16, a USB interface 17, and an IEEE1394 interface 18.

The RAM 12 temporarily stores at least part of the OS and application programs executed by the CPU 11. Also, the RAM 12 stores various other data necessary for the processing by the CPU 11. The HDD 13 stores the OS and application programs. The graphics processor 14 is connected with a monitor 21 and, in accordance with instructions from the CPU 11, displays images on the screen of the monitor 21. The input interface 15 is connected with a keyboard 22a and a mouse 22b, and sends signals from the keyboard 22a and the mouse 22b to the CPU 11 through the bus 19. The communication interface 16 is connected to a network 23 and transmits/receives data to/from other devices via the network 23. The USB interface 17 is connected, through USB ports, with USB devices 24a and 24b, and sends signals from the USB devices 24a and 24b to the CPU 11 through the bus 19. Also, in accordance with instructions from the CPU 11, the USB interface transmits signals to the USB devices 24a and 24b. The USB devices may be of various types including input devices such as a scanner, output devices such as a printer, external memory, etc. Also, the keyboard 22a and the mouse 22b may be connected via the USB interface 17. The IEEE1394 interface 18 is connected with an IEEE1394-compliant device and, like the other interfaces, controls the data exchange between the IEEE1394-compliant device and the CPU 11.

The processing function of the embodiment is accomplished by the hardware configuration described above.

Figure 4:
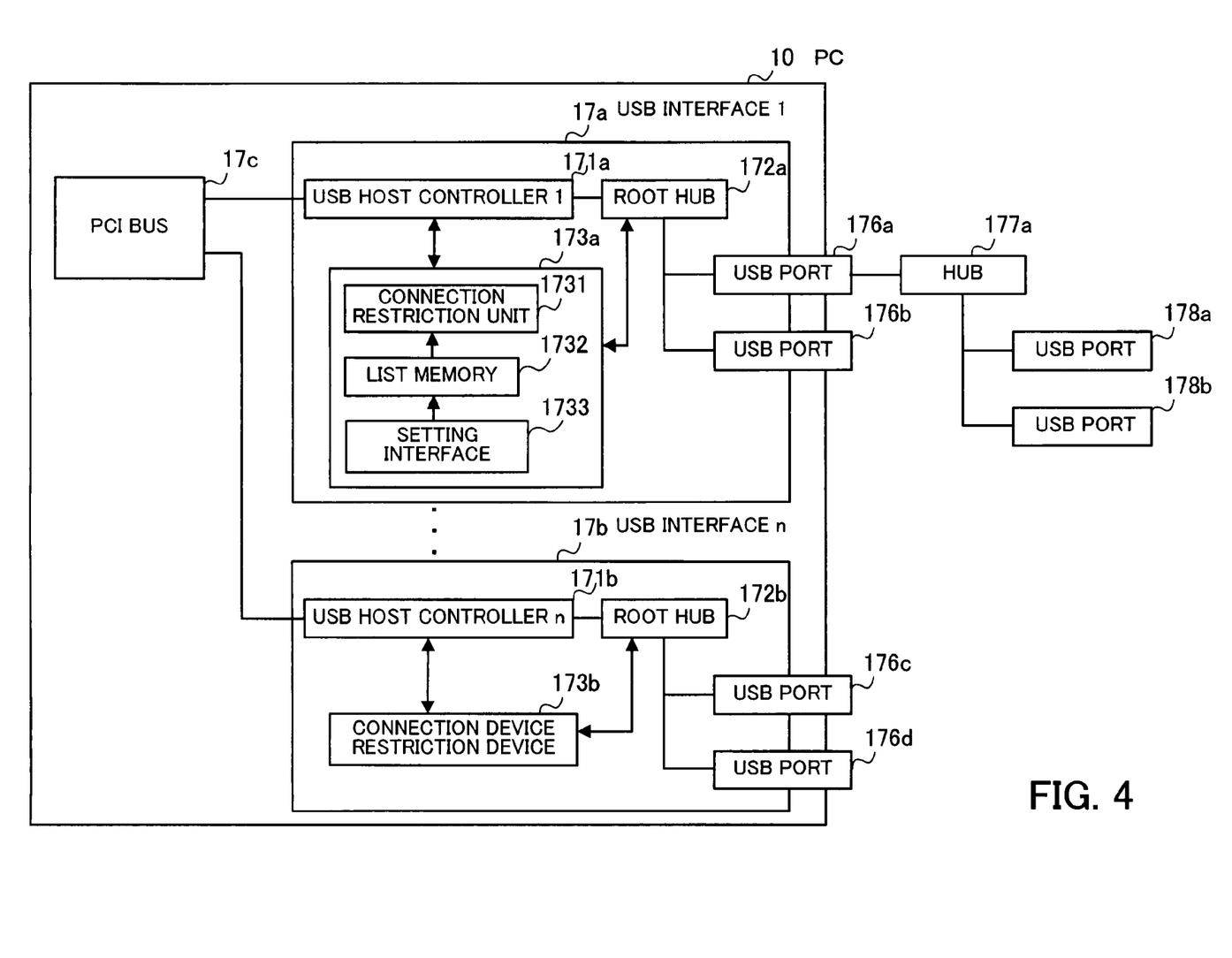
FIG. 4 is a block diagram exemplifying USB interfaces according to the embodiment.

The USB interface will be now described in detail. FIG. 4 is a block diagram exemplifying the USB interface according to the embodiment, and in FIG. 4, the other elements of the PC appearing in FIG. 3 are omitted.

The USB interface includes a total of n USB interfaces 17a, . . . , 17b each connected to the PC via a PCI bus 17c. Each USB interface, for example, the USB interface 1 (17a) has a USB host controller 1 (171a), a root hub 172a, and USB ports 176a and 176b. Information on devices connected to the USB ports 176a and 176b is passed on to the root hub 172a and the USB host controller 1 (171a). The USB port 176a, which is provided on the body of the PC, may be connected with USB ports 178a and 178b through a hub 177a. A connection device restriction device 173a includes a connection restriction unit 1731, a list memory 1732 storing the connection permission list, and a setting interface 1733. The restriction device 173a is incorporated in the USB host controller 1 (171a) or the root hub 172a or is arranged between the two and manipulates information flowing along the aforementioned route to restrict use of devices. The setting interface 1733 performs the process of acquiring a connection permission list created in accordance with a setting application prepared in the PC and storing the acquired list in the list memory 1732. The connection restriction unit 1731 acquires information flowing along the above route and, in accordance with the connection permission list stored in the list memory 1732, permits the information to be transferred to the PC side through the PCI bus 17c if connection of the corresponding device is permitted, or forbids the information to be transferred to the PC side if connection of the corresponding device is not permitted. This process will be described in detail later.

Similarly, the USB interface n (17b) includes a USB host controller n (171b), a root hub 172b, and USB ports 176c and 176d, and a connection device restriction device 173b is incorporated in the USB host controller n (171b) or the root hub 172b or is arranged between the two.

In this manner, the connection device restriction device is located near the connection ports through which information flows in from peripheral devices, to restrict use of the devices.

The connection device restriction device may be provided for each USB port such that the number of restriction devices is equal to that of the USB ports. This arrangement is, however, very costly as seen from FIG. 4 and lacks practicality.

In the following, information obtained from a USB device connected to a USB port will be explained. According to the USB driver interface specification (OpenUSBDI: Open Universal Serial Bus Driver Interface), a USB device sends a USB_DEVICE_DESCRIPTOR, which is a description of the device, in response to a USB device information request from a management agent.

Figure 5:
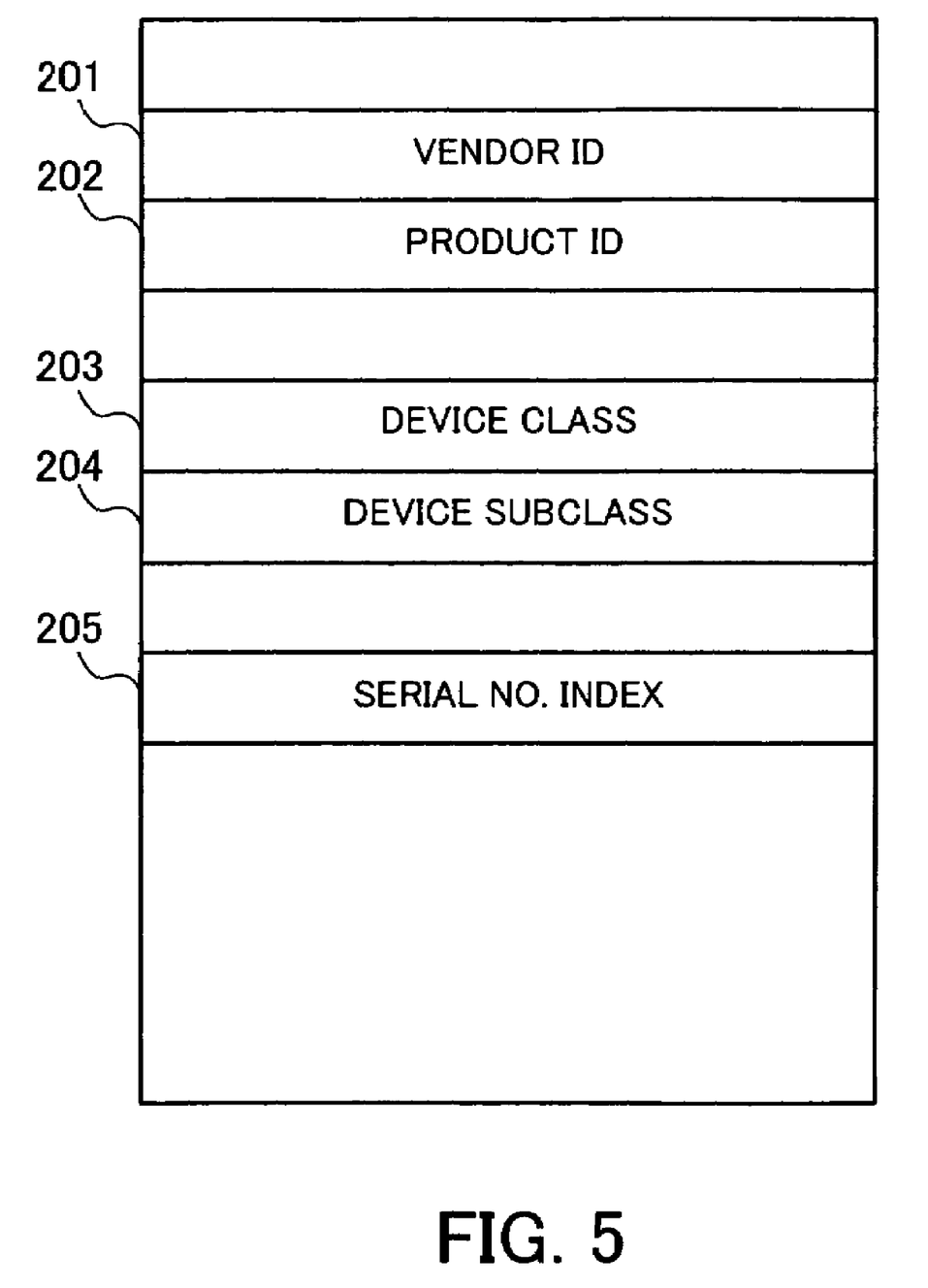
FIG. 5 shows the arrangement of a USB_DEVICE_DESCRIPTOR.

FIG. 5 shows the arrangement of the USB_DEVICE_DESCRIPTOR, wherein only the part pertaining to the embodiment is extracted.

The USB_DEVICE_DESCRIPTOR has fields including "VENDOR ID" 201, "PRODUCT ID" 202, "DEVICE CLASS" 203, "DEVICE SUBCLASS" 204, "SERIAL NO. INDEX" 205, etc. In the field "VENDOR ID" 201, a vendor ID determined by the USB Device Working Group is set. In the field "PRODUCT ID" 202 is set a product ID similarly determined with respect to each product. In the field "DEVICE CLASS" 203, a similarly determined device class code is set, and in the field "DEVICE SUBCLASS" 204, a subclass code is set. If the value in the device class field is "9", for example, then the device in question is a USB hub. In the field "SERIAL NO. INDEX" 205 is set information indicative of the location of a serial number described in the ASCII code.

Thus, using the device description information (USB_DEVICE_DESCRIPTOR) obtained from USB devices, the connection permission list is set so as to restrict use of the USB devices.

The process for restricting use of USB devices will be now described. In conventional techniques, when notified of the connection of a USB device to a connection port, the OS requests the description information (USB_DEVICE_DESCRIPTOR) from the connected USB device. Also, in the above description of the embodiment, when a USB device is connected to a connection port, the connection device restriction device is notified of the connection of the USB device, and if it is judged by the connection device restriction device that connection of the USB device is permitted, the OS is notified of the connection of the device. Alternatively, a notification indicating the connection of a USB device may once be sent to the OS and the response for USB_DEVICE_DESCRIPTOR, generated by the OS, may be used for the purpose of control. Also in this case, a similar function can be performed.

The following describes the case where the response for USB_DEVICE_DESCRIPTOR generated by the OS is utilized to restrict use of devices. It is assumed that the connection permission list has the arrangement shown in FIG. 2, that higher strength requires more specification items such as vendor ID, product ID and serial number, and that the exception information specifies that connection of USB hub devices is always permitted, and includes permit/forbid setting made with respect to all HID devices.

Figure 6:
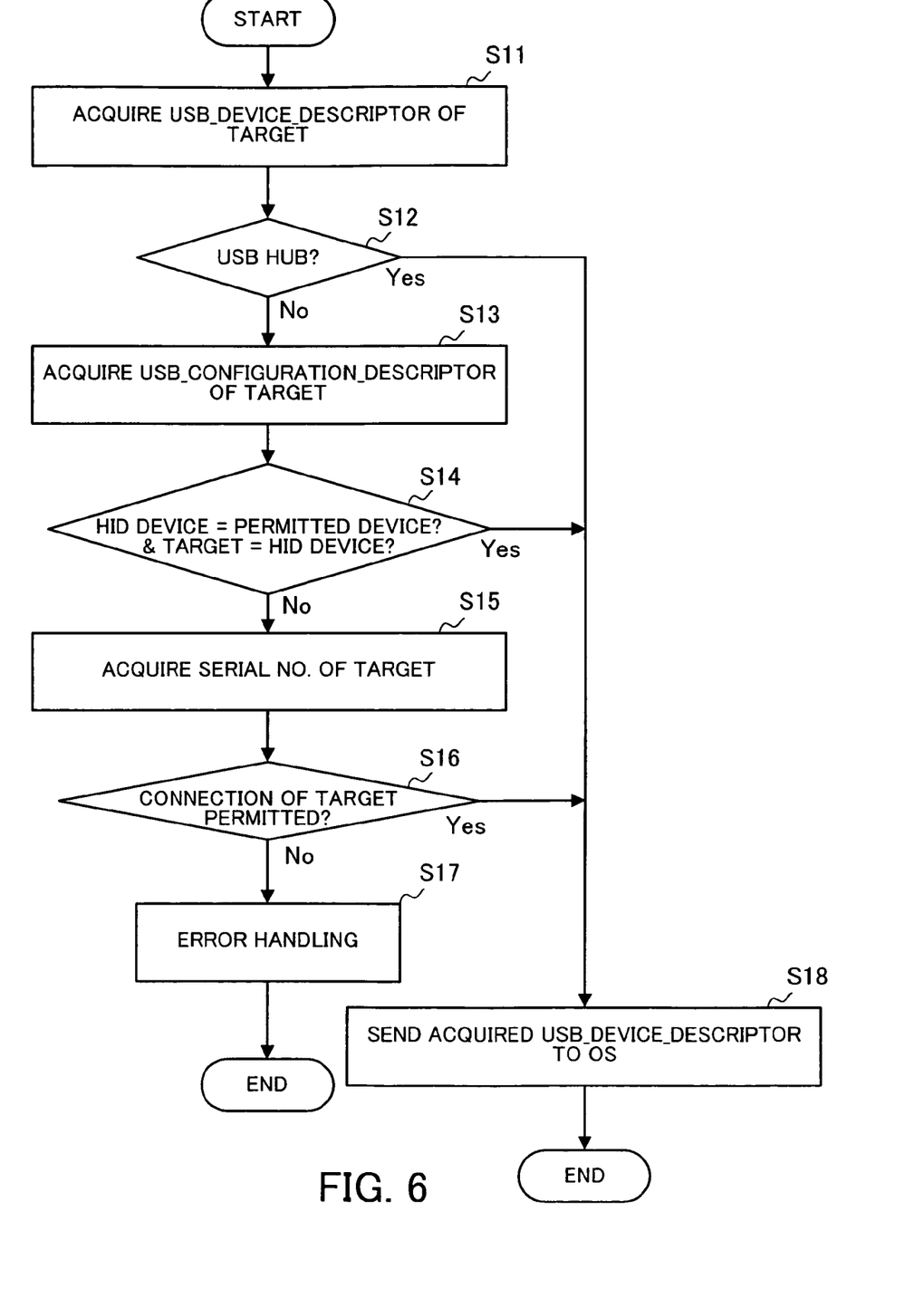
FIG. 6 is a flowchart showing a USB device connection restriction process according to the embodiment.

FIG. 6 is a flowchart showing a USB device connection restriction process according to the embodiment.

The process is started when a request to acquire the USB_DEVICE_DESCRIPTOR of a target is received from the OS.

[Step S11] A USB_DEVICE_DESCRIPTOR is acquired from a target USB device connected to the connection port. The USB_DEVICE_DESCRIPTOR includes the vendor ID, product ID, device class and serial number index of the target device, as shown in FIG. 5, as well as pointer information used for acquiring other information.

[Step S12] The exception information is processed first. It is determined whether the target device is a USB hub or not. If the value in the device class field is "9", the device is a USB hub. Connection of USB hubs is always permitted, as shown in FIG. 2, and therefore, where the target device is a USB hub, the process proceeds to Step S18.

[Step S13] If the target device is not a USB hub, a USB_CONFIGURATION_DESCRIPTOR is additionally acquired from the target device.

[Step S14] It is determined whether or not the exception information specifies that connection of HID devices is always permitted, and also whether or not the target device is an HID device. If the exception information indicates that connection of HID devices is always permitted, it is confirmed whether the target is an HID device. If the interface class field in the USB_INTERFACE_DESCRIPTOR in the USB_CONFIGURATION_DESCRIPTOR shows the value "3", then the target device is an HID device. If the target is an HID device and also if the exception information specifies that connection of HID devices is permitted, the process proceeds to Step S18.

[Step S15] If connection of the target is not permitted in the course of the exception information check in Steps S12 to S14, the target is collated with the permitted devices registered in the connection permission list. Based on the serial number index in the USB_DEVICE_DESCRIPTOR, a serial number is acquired from a USB_STRING_DESCRIPTOR of the target. The vendor ID and the product ID are already acquired from the USB_DEVICE_DESCRIPTOR.

[Step S16] The vendor ID, product ID and serial number of the target are collated with those of the permitted devices 1 through n registered in the connection permission list. At this time, the vendor ID alone is collated if the registered strength level is "1", the vendor ID and the product ID are collated if the strength level is "2", and all of the vendor ID, product ID and serial number are collated if the strength level is "3". If the target is found to be a permitted device, the process proceeds to Step S18.

[Step S17] If the target is not a permitted device, an error notification is sent to the OS and the process is ended, whereby the OS regards the target as not operating normally and does not establish connection therewith. Namely, the target cannot be used. If necessary, a message to the effect that use of the target device is not permitted may be displayed on the monitor.

[Step S18] Since the target is a permitted device, the acquired USB_DEVICE_DESCRIPTOR is sent to the OS and the process is ended. Thus, the OS regards the target as operating normally and allows use of the target.

The process described above is executed, whereby use of uncalled-for devices is forbidden in accordance with the connection permission list. The connection device restriction device monitors a USB_DEVICE_DESCRIPTOR request from the OS and, on detection of the request, executes the above process. If error is notified at the time of connection, the OS does not establish connection with the target, so that the target remains unusable thereafter.

Thus, with the connection device restriction device, restriction on use of devices can be set as desired so as to match the mode of operation, and since it is unnecessary to modify the processes executed by the OS and the target USB device, the restriction device can be easily applied to existing systems.

In the foregoing is described the case where restriction is placed on connection devices connected to USB ports. The present invention can also be applied to restriction of connection devices connected to other types of connection port, such as an IEEE1394 port.

Also, in the above description, the PC uses the connection permission list as a common list. The PC may alternatively set user accounts for respective users so that the users may use their respective accounts. In this case, connection permission lists are prepared for the respective user accounts such that restrictions on use of devices are set for the respective users.

Figure 7:
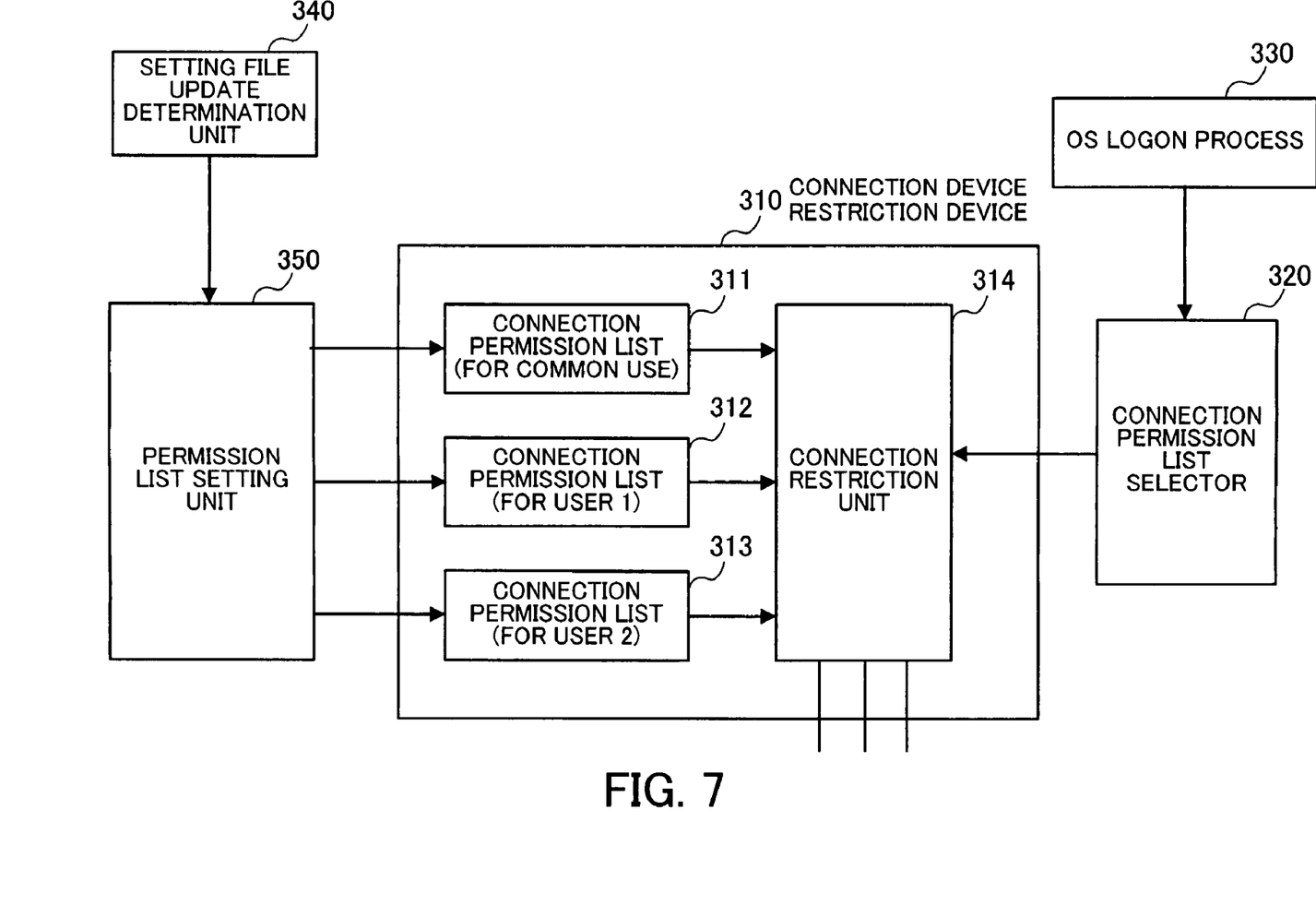
FIG. 7 shows the configuration of a connection device restriction device of another embodiment which has connection permission lists associated with respective user accounts.

FIG. 7 shows the configuration of a connection device restriction device according to another embodiment, wherein the restriction device has connection permission lists prepared for respective user accounts.

The connection device restriction device 310 has a connection permission list 311 which is used in common for all users, a user-specific connection permission list (for user 1) 312, a user-specific connection permission list (for user 2) 313, and a connection restriction unit 314. In the illustrated example, a permission list setting unit 350 for setting the connection permission lists is provided externally to the connection device restriction device 310. Further, a setting file update determination unit 340 and a connection permission list selector 320 are additionally provided. The functions of the connection permission list selector 320, setting file update determination unit 340 and permission list setting unit 350 are accomplished by causing a computer, in which the connection device restriction device 310 is incorporated, to execute the connection device restriction program or a related interface program.

The connection permission list 311 of the connection device restriction device 310 is used in common for all users and is looked up by the connection restriction unit 314 regardless of user account. The connection permission list (for user 1) 312 and the connection permission list (for user 2) 313 are selected in accordance with user accounts and are looked up by the connection restriction unit 314.

The connection permission list selector 320 detects the account of a user who logged on by a logon process 330 of the OS, selects the corresponding connection permission list, and notifies the connection restriction unit 314 of the selected list. During a logoff process of the OS, the selector 320 instructs the connection restriction unit 314 to deselect the connection permission list which has been selected until then.

When updating of a connection permission list by a setting tool, described later, is detected, the setting file update determination unit 340 notifies the permission list setting unit 350 that the connection permission list has been updated. An update instruction may alternatively be generated by the administrator who updated the connection permission list.

On detection of updating of a setting file, the permission list setting unit 350 updates the corresponding connection permission list.

Operation of the connection device restriction device 310 will be now described.

In a default state at the start of the PC, no user-specific connection permission list is selected by the connection permission list selector 320, and the connection restriction unit 314 executes the device connection restriction process by using the connection permission list (for common use) 311.

When a user account is set in the logon process 330 of the OS, a connection permission list for user n (the list 312 for user 1 or the list 313 for user 2) which corresponds to the account of the logged-on user is selected by the connection permission list selector 320. The connection restriction unit 314 then performs the device connection restriction process by using the selected connection permission list (the list 312 for user 1 or the list 313 for user 2) and the connection permission list (for common use) 311.

On execution of a logoff process of the OS, the connection permission list for user n (the list 312 for user 1 or the list 313 for user 2) which corresponds to the account of the logged-off user is deselected by the connection permission list selector 320. The connection restriction unit 314 then performs the device connection restriction process by using only the connection permission list (for common use) 311.

Thus, in response to logon and logoff, a different connection permission list is selected and deselected, whereby restriction on use of devices can be set differently depending on the user.

The following describes the manner of updating a connection permission list.

Using the setting tool, the administrator sets a connection permission list, whereupon the setting file update determination unit 340 automatically detects the setting of the list or is notified of the setting by the administrator, and then outputs a permission list update instruction to the permission list setting unit 350. The permission list setting unit 350 stores the updated permission list in the corresponding list memory of the connection device restriction device 310. In accordance with the updated connection permission list, the connection restriction unit 314 performs the device connection restriction process.

In the case where the updated permission list forbids the connection of an already permitted device, the OS is restarted to forbid the connection of the device. For example, the permission list setting unit 350 detects the need for restart of the OS and displays an appropriate message on the monitor to urge the user to restart the OS.

Figure 8:
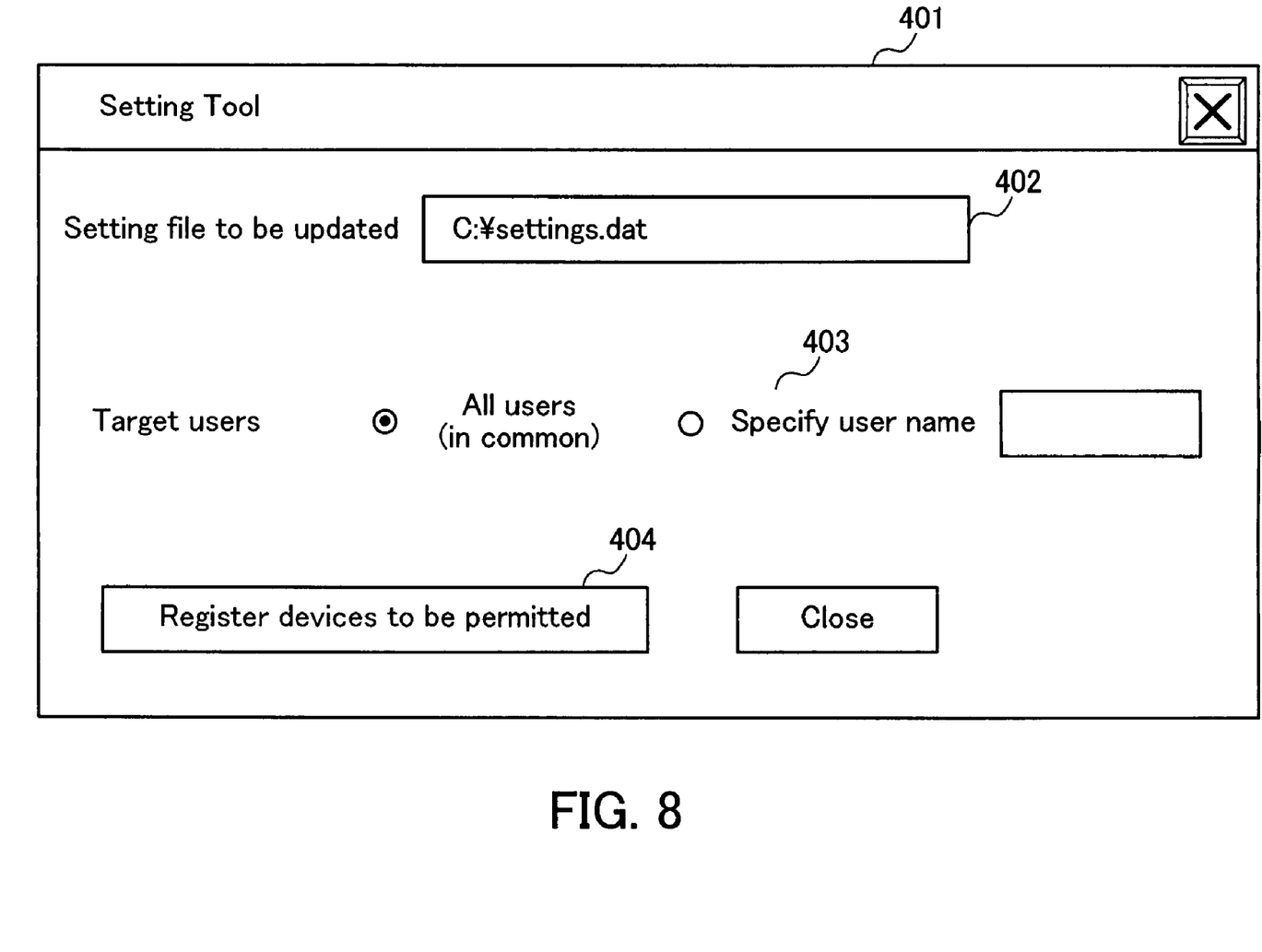
FIG. 8 exemplifies a setting tool screen according to the embodiment.

The setting tool will be now described with reference to FIG. 8 exemplifying a setting tool screen according to the embodiment.

The setting tool screen 401 has a field 402 for selecting a setting file (connection permission list) to be updated, and a user selection field 403 for selecting all users or a specific user as target user(s). The administrator who is to make changes sets a setting file to be updated as well as target users, and presses a "Register devices to be permitted" button 404 to proceed to the next step of the setting process.

If the "Register devices to be permitted" button 404 is thus pressed with a target setting file and target users specified, the screen switches to a screen for registering devices whose connection is to be permitted.

Figure 9:
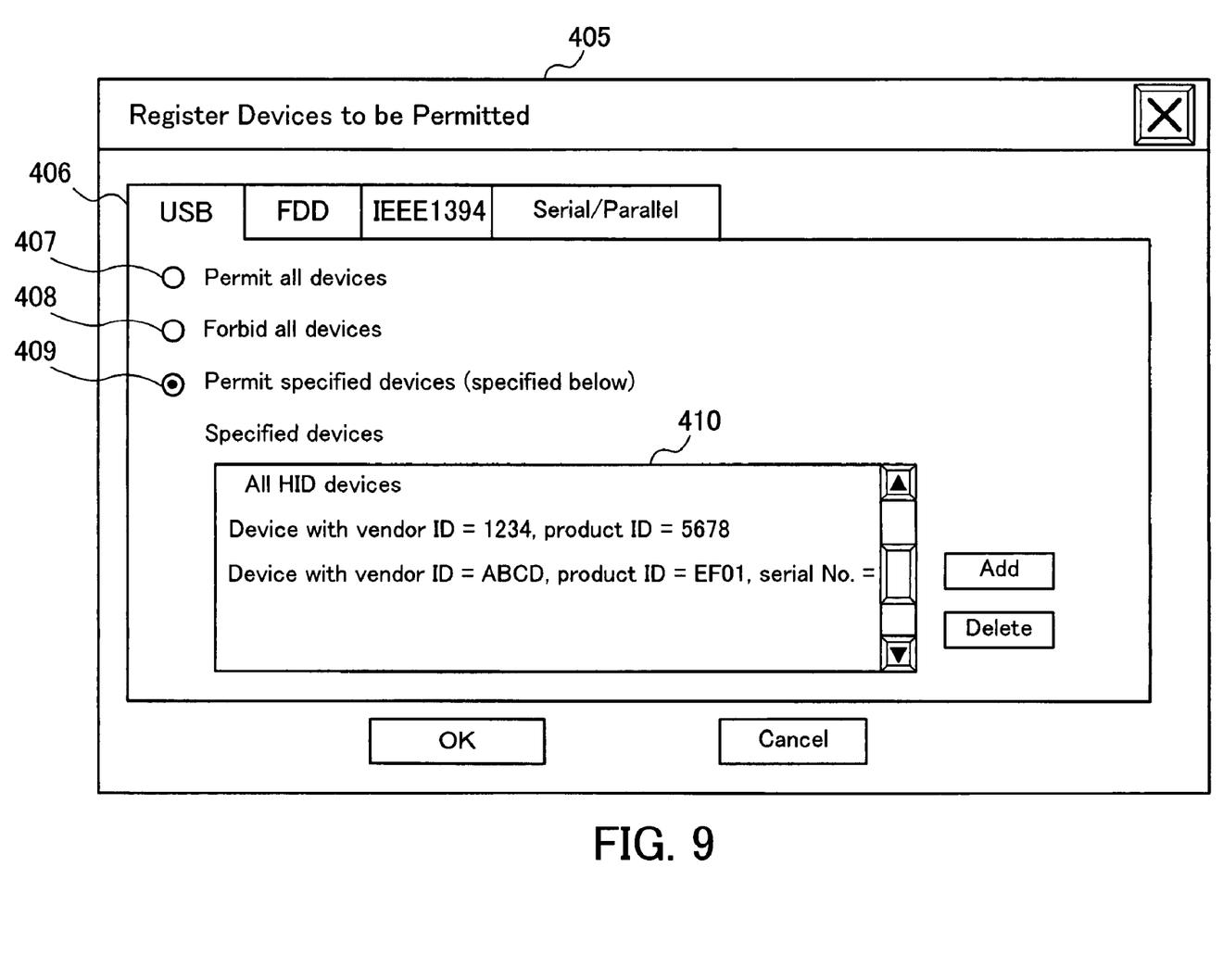
FIG. 9 exemplifies a connection-permitted device registration screen according to the embodiment.

FIG. 9 exemplifies such a registration screen according to the embodiment, which is displayed to allow registration of devices whose connection is to be permitted.

First, on the device registration screen 405, a device type to which the target device belongs is selected (in the illustrated example, the device types include USB, FDD (Floppy (registered trademark) Disk Drive), IEEE1394, and Serial/Parallel). In the following description, it is assumed that the USB 406 is selected.

When the USB 406 is selected, a "Permit all devices" option 407, a "Forbid all devices" option 408 and a "Permit specified devices" option 409 for setting devices to be permitted are displayed as exception information items. If the option "Permit all devices" 407 is selected, the exception information is set such that connection of all USB devices is permitted. On the other hand, if the option "Forbid all devices" 408 is selected, the exception information is set such that connection of all USB devices is forbidden. If the option "Permit specified devices" 409 is selected, a "Specified devices" field 410 is displayed in which is shown a list of devices currently set in the selected setting file. By rewriting the "Specified devices" field 410, it is possible to modify the settings of permitted devices. In the illustrated example, the setting "All HID devices" has been entered, and in this case, the exception information is set accordingly.

Figure 10:
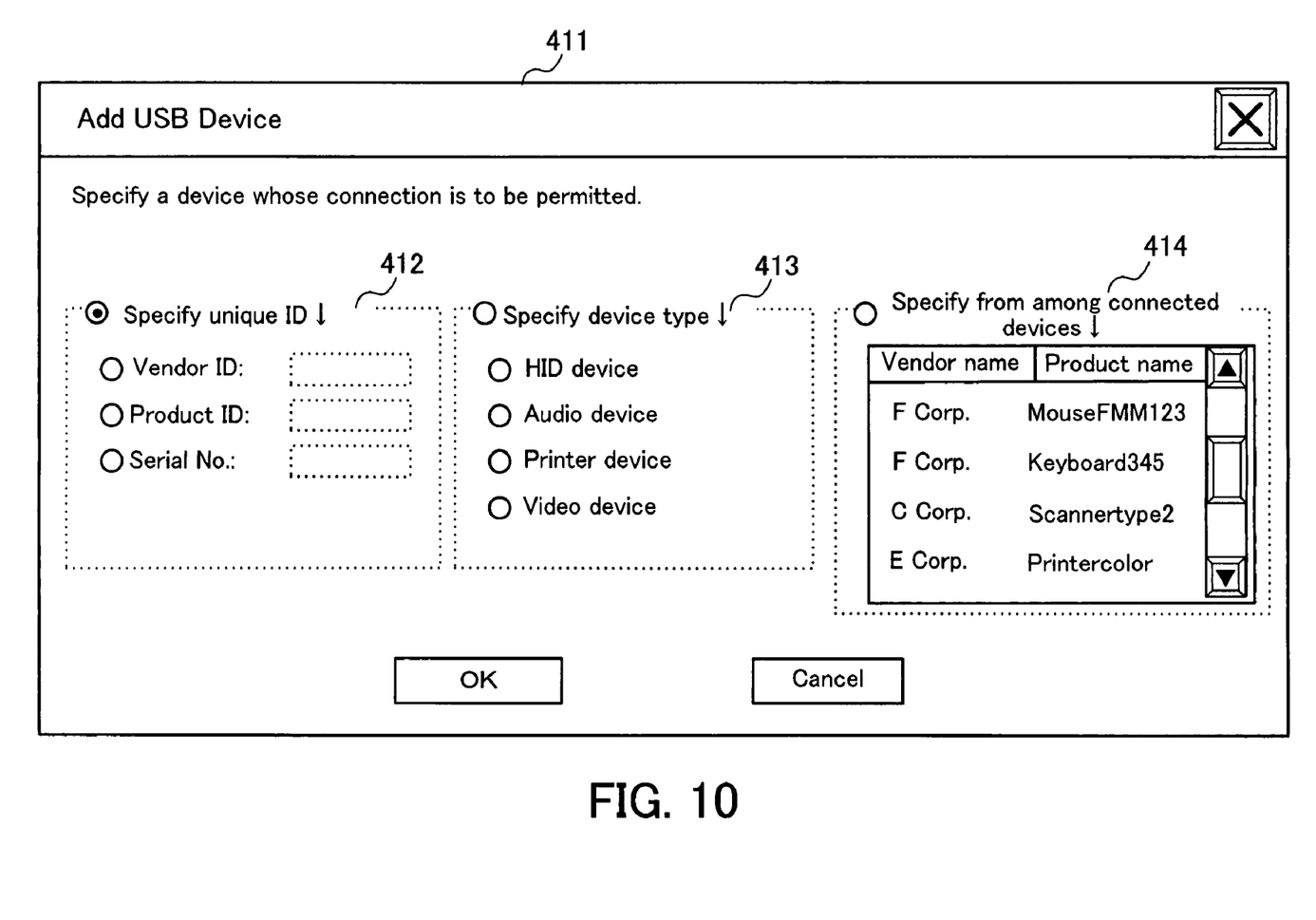
FIG. 10 exemplifies an add USB device screen according to the embodiment.

Further, when a USB device is added to the connection permission list, an "Add USB device" screen, for example, is displayed to facilitate the designation of the device. FIG. 10 exemplifies such an "Add USB device" screen according to the embodiment.

The "Add USB device" screen 411 has a "Specify unique ID" field 412 for entering a device unique ID to set a permitted device, a "Specify device type" field 413 for specifying a device type, and a "Specify from among connected devices" field 414 for specifying a device from among the currently connected devices. The administrator may use the easiest-to-use field to specify a device.

As described above, each device setting screen has a screen for specifying a device whose connection is to be permitted, and the screen for specifying a device provides a method whereby a device can be most uniquely specified according to its capability. In the case of a USB device, for example, the device is specified by its vendor ID/product ID/serial number. To facilitate the setting, the device specifying screen also provides a method whereby a device type can be specified. For example, HID devices or the like, which are less likely to cause security problems, may be specified by category so that connection of all devices falling under the category may be permitted. In addition, the device specifying screen provides a method whereby a device can be specified from among the currently connected devices.

In the above description, the embodiment is applied to USB devices. Where the OS has a Plug-and-Play (hereinafter PnP) mechanism, for example, use of devices may be restricted by intervening in the messaging procedure at the start of the computer or at the time a PnP device is plugged.

The following describes the case of restricting use of devices in Windows 2000/XP (registered trademark).

At the start of the computer or at the time a PnP device is plugged, the PnP manager of the OS sends out an IRP_MJPNP/IRP_MN_START_DEVICE request. In response to the request, each device driver starts to use the corresponding device. Accordingly, the connection device restriction device is arranged on a route where the restriction device can receive all IRP_MJPNP/IRP_MN_START_DEVICE requests.

The connection device restriction device receives each IRP_MJPNP/IRP_MN_START_DEVICE request and acquires information whereby the uniqueness of the corresponding device can be checked. In the case of a USB device, for example, the information to be acquired includes USB_DEVICE_DESCRIPTOR, USB_CONFIGURATION_DESCRIPTOR, and USB_STRING_DESCRIPTOR containing the serial number.

Then, the information acquired from the target device is collated with the connection permission list to determine whether or not the acquired information is included in the list. If the list includes the acquired information, the process is advanced in the regular way. Namely, the IRP_MJPNP/IRP_MN_START_DEVICE is returned intact to the OS as if there was no intervention, whereupon the use of the device is started. On the other hand, if the information acquired from the target device is not included in the connection permission list, "failure" is returned, as a returned value, in response to the IRP_MJPNP/IRP_MN_START_DEVICE request. Consequently, the device fails to be started and remains unusable thereafter.

The process described above can be performed by a computer. In this case, a program is prepared in which is described the process for performing the function of the connection device restriction device. The program is executed by a computer, whereupon the aforementioned processing function is accomplished by the computer. The program describing the required process may be recorded on a computer-readable recording medium. The computer-readable recording medium includes a magnetic recording device, an optical disc, a magneto-optical recording medium, a semiconductor memory, etc. The magnetic recording device may be a hard disk drive (HDD), a flexible disk (ED), a magnetic tape or the like. As the optical disc, a DVD (Digital Versatile Disc), a DVD-RAM (Random Access Memory), a CD-ROM (Compact Disc Read Only Memory), a CD-R (Recordable)/RW (ReWritable) or the like may be used. The magneto-optical recording medium includes an MO (Magneto-Optical disk) etc.

To market the program, portable recording media, such as DVDs and CD-ROMs, on which the program is recorded may be put on sale. Alternatively, the program may be stored in the storage device of a server computer and may be transferred from the server computer to other computers via a network.

A computer which is to execute the program stores in its storage device the program recorded on a portable recording medium or transferred from the server computer, for example. Then, the computer loads the program from its storage device and performs processing in accordance with the program. The computer may load the program directly from the portable recording medium to perform the process in accordance with the program. Also, as the program is transferred from the server computer, the computer may sequentially perform the process in accordance with the received program.

According to the present invention, when a connection device is connected to a connection port, device information is acquired from the connection device and is collated with the connection permission list to determine whether or not the connection device corresponds to any connection-permitted device defined in the list. Connection of the connection device is permitted only if the connection device is a connection-permitted device. In the connection permission list, specification items for specifying connection-permitted devices, such as device types, device designations and user designations, can be set as needed. This enables the administrator to set desired restrictive conditions matching the mode of operation, to restrict use of connection devices which users are allowed to use. Also, by setting required specification items defining connection-permitted devices in the connection permission list, it is possible to prevent the use of uncalled-for devices, thereby enhancing the security.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a connection device restriction program for restricting use of connection devices connected to a computer, the connection device restriction program causing the computer to perform a method comprising:

setting a connection permission list defining a connection-permitted device which is permitted to connect with the computer and storing the connection permission list in a list memory, the connection permission list including a permission level of the connection-permitted device;

acquiring device information including a plurality of specification items from a connection device when the connection device is connected;

collating one or more specification items out of the plurality of specification items included in the acquired device information with the connection permission list to determine whether or not the connection device corresponds to the connection-permitted device registered in the connection permission list; and permitting connection of the connection device if the connection device corresponds to the connection-permitted device and otherwise forbidding connection of the connection device, wherein a number of specification items to be collated with the connection permission list is determined based on the permission level included in the connection permission list.

2. The computer-readable medium according to claim 1, wherein, in said connection permitting/forbidding, the computer sends a notification that the connection device has been connected, to a processor for performing a process relating to the connection device if connection of the connection device is permitted, and does not send the notification to the processor if connection of the connection device is forbidden.

3. The computer-readable medium according to claim 1, wherein, in said connection permission list setting, the computer allows a type of the connection-permitted device to be set as a specification item for specifying the connection-permitted device, and in said collating, the computer determines whether or not a type of the connection device is identical with that of the connection-permitted device set in the connection permission list.

4. The computer-readable medium according to claim 3, wherein, in said connection permission list setting, the computer allows a setting to be made as needed such that connection of all connection devices corresponding to the type of the connection-permitted device should be forbidden, and in said collating, the computer forbids connection of the connection device if the type of the connection device is identical with that of the connection-permitted device set in the connection permission list and also if the connection permission list includes the setting such that connection of the connection devices corresponding to the type of the connection-permitted device should be forbidden.

5. The computer-readable medium according to claim 1, wherein, in said connection permission list setting, the computer allows a number of devices to be set in the connection permission list as the connection-permitted device, and in said collating, the computer determines whether or not the connection device corresponds to any one of the set number of connection-permitted devices.

6. The computer-readable medium according to claim 1, wherein, in said connection permission list setting, the computer allows the connection permission list to be set with respect to users in common or with respect to each user, and in said collating, the computer performs the collation by using the connection permission list selected in accordance with the user.

7. The computer-readable medium according to claim 6, wherein, in said connection permission list setting-step, the computer stores the connection permission list of said each user in association with a user account of the user, selects the connection permission list corresponding to the user account selected during a logon process, and deselects the connection permission list corresponding to the selected user account during a logoff process.

8. A connection device restriction device for restricting use of connection devices connected to a computer, comprising:

permission list setting unit to set a connection permission list based on information defining a connection-permitted device which is permitted to connect with the computer, the connection permission list including a permission level of the connection-permitted device;

a list memory to store the connection permission list; and a connection restriction unit to acquire device information including a plurality of specification items from a connection device when the connection device is connected, to collate one or more specification items out of the plurality of specification items included in the acquired device information with the connection permission list to determine whether or not the connection device corresponds to the connection-permitted device registered in the connection permission list, and to permit connection of the connection device if the connection device corresponds to the connection-permitted device and otherwise to forbid connection of the connection device, wherein a number of specification items to be collated with the connection permission list is determined based on the permission level included in the connection permission list.

* * * * *